April 12, 1938.  R. H. DRAEGER  2,113,578
READING MACHINE
Filed Nov. 14, 1935  3 Sheets-Sheet 1

INVENTOR.
Rupert H. Draeger.
By Robert A. Lavender
Attorney

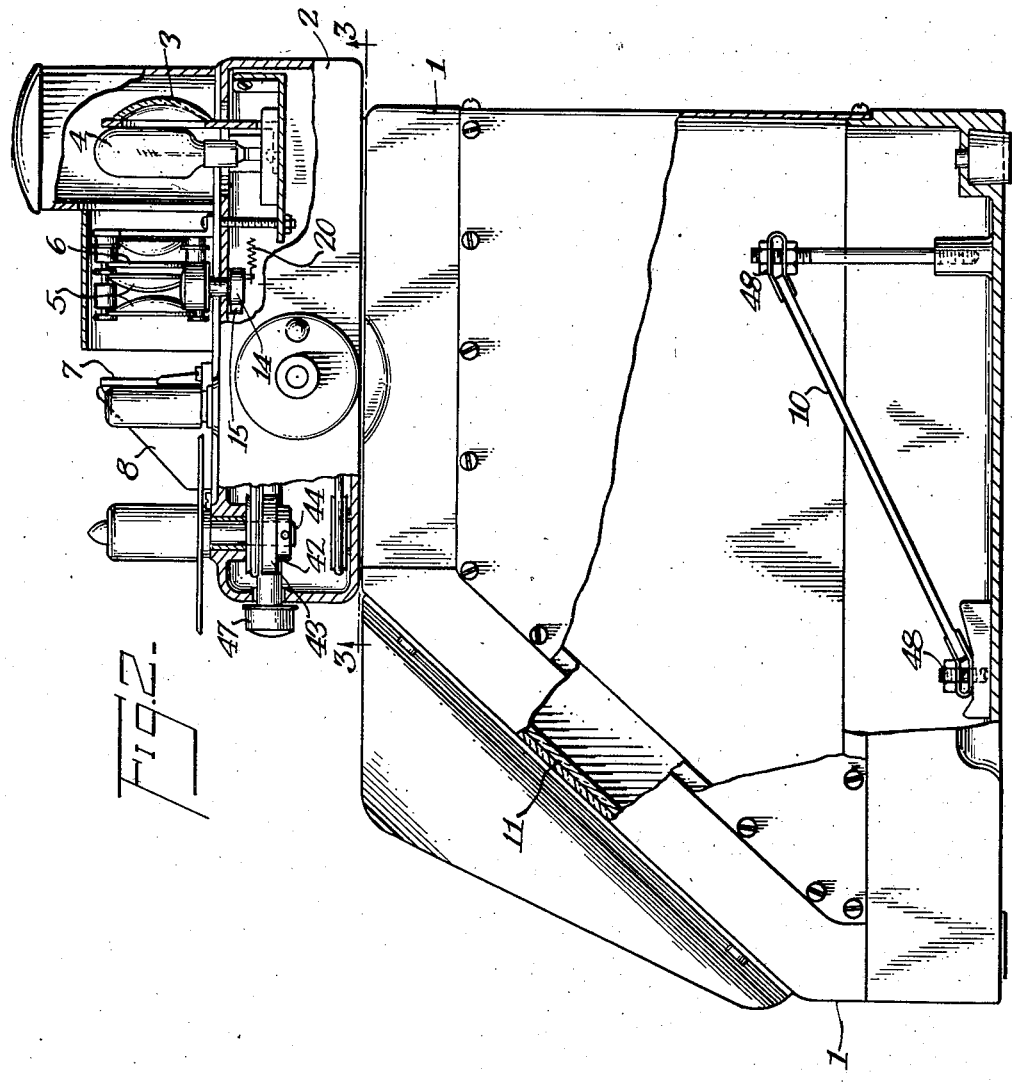

April 12, 1938.  R. H. DRAEGER  2,113,578
READING MACHINE
Filed Nov. 14, 1935   3 Sheets-Sheet 3
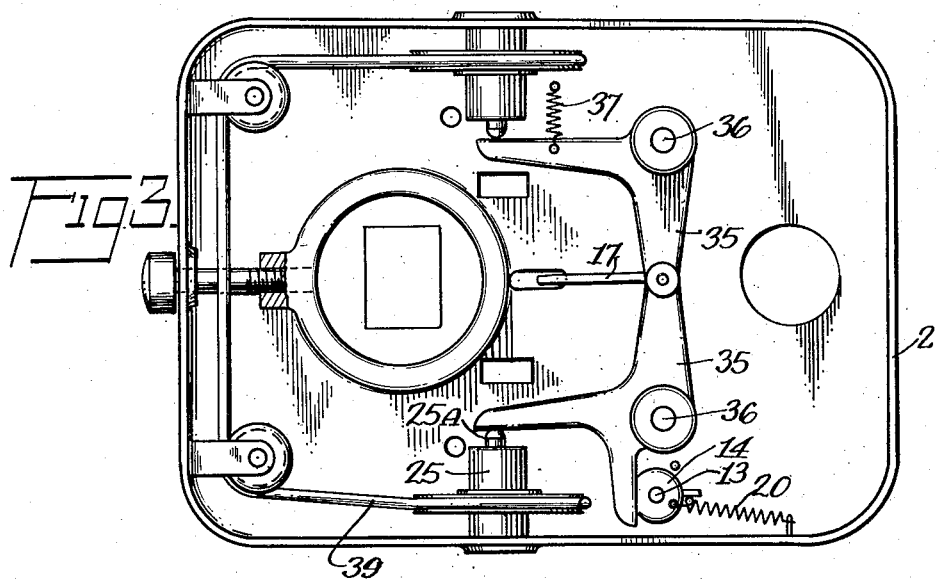
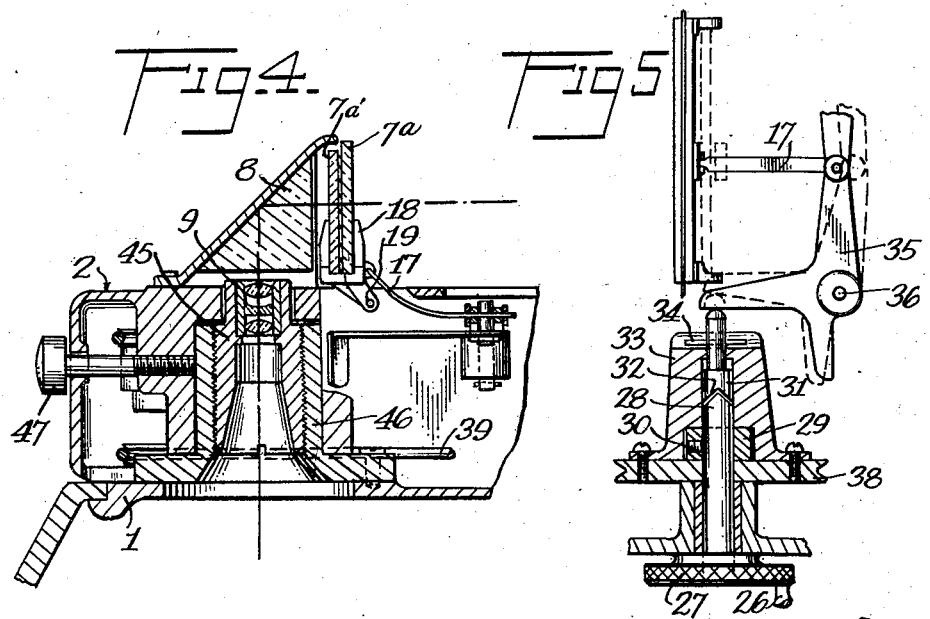
Inventor
Rupert H. Draeger.
By Robert A. Lavender
Attorney Patented Apr. 12, 1938

2,113,578

UNITED STATES PATENT OFFICE 2,113,578

READING MACHINE

Rupert H. Draeger, United States Navy

Application November 14, 1935, Serial No. 49,757

11 Claims. (Cl. 88—24)

(Granted under the act of March 3, 1883, as amended April 30, 1928; 370 O. G. 757)

This invention relates to reading machines and more particularly to reading machines of the type adapted to the use of photographic strip film as the medium containing the reading matter. Heretofore reading matter on film has been chiefly for use in moving picture theatres, using a projection on large screens to be viewed by large audiences, or merely for a record, used occasionally as a reference with little attention being paid to high definition of the image. Some few attempts have been made to design a reading machine for use with books on film, but these are neither compact designs capable of being carried from office to home, or to great distances on vacations, or on speech making tours, as are portable typewriters, nor are they capable of producing an image on a translucent screen of such quality as to be as easy on the eyes as good print on good paper under the proper lighting.

The object of this invention is to overcome the above objections, and at the same time produce a neat and compact, light weight, precision instrument at a moderate cost. The advantages of this new machine are such as to overcome any prejudices which may exist against reading from anything other than a printed book or a typewritten manuscript and yet be within the reach of all who will have occasion to take advantage of the new sources of knowledge opened up and readily accessible to everyone through this comparatively new method of publication. The dissemination of scientific knowledge, old and new, will be invaluable to scientists working in such specialized fields that those interested in the details are so limited in number as to leave ordinary publishing costs prohibitive. Small libraries have neither space nor money to offer endless material to readers, but with all of the large libraries co-operating on a supply of film copies of anything printed, typewritten or in long-hand and with ample facilities for reading the film copies in every library and many homes, the availability of all literature will be increased many times.

Special objects of this invention are to provide a machine which may be set upon a desk or table and of such design that the pages of a book on film may be made to appear before the reader clearly in daylight or in a lighted room and be made to turn forward or backward with a minimum of effort, and also be made to appear right side up on the screen regardless of their position or positions on the film.

A further object is to provide a reading machine which handles the film with such ease and freedom from physical harm as to leave the film in practically new condition after many insertions in the machine.

In the accompanying drawings, which illustrate a preferred embodiment of the invention:

Fig. 2 is a side elevation with part of the side panel cut away;

Fig. 3 is a plan view of the head of the machine below line 3—3 of Fig. 2.

Fig. 4 is a sectional view of a part of the rotatable head; and

Fig. 5 is a plan view of film crank and film gate opening mechanisms.

Figure 1:
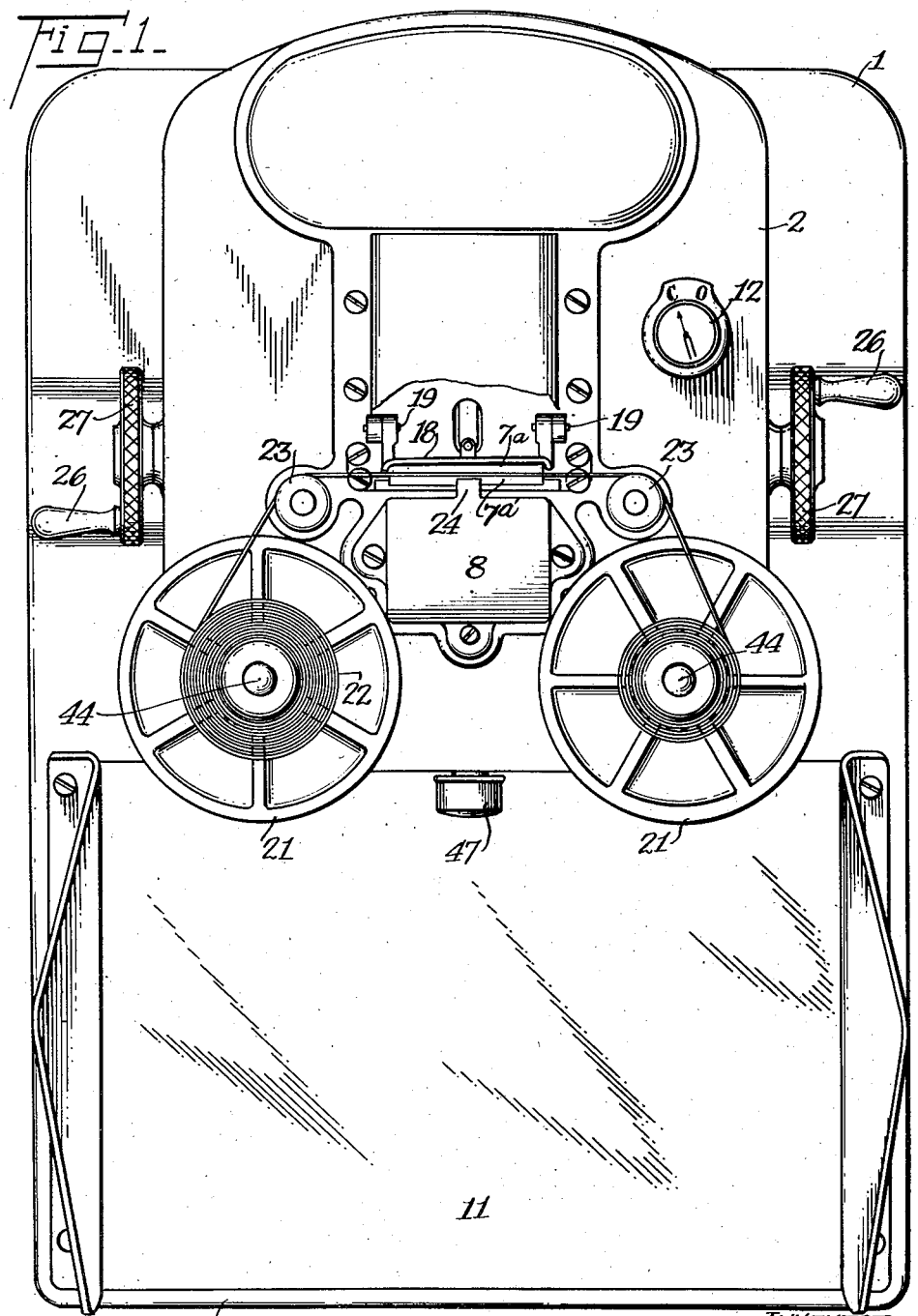
Fig. 1 is a plan view of the novel machine.

There is shown at 1 a housing forming a light-tight projection chamber and having rotatably mounted thereon a head 2 carrying the light source 4, optical projection system, film spool spindles 44, film guides 23, film indexing mechanism and means for holding the head in any desired orientation. The optical system consists of reflector 3, projection lamp 4, condenser lenses 5, transparent heat absorbing medium 6, transparent film gate 7, internal reflecting prism 8, objective lens combination 9, front surface mirror 10, and translucent projection screen 11.

This optical system may be permanently adjusted at the time of manufacture to obviate the necessity for one unacquainted with such systems having to attempt getting the best image on the screen. The parts of this system may be of any of the usual designs though it is necessary for best results to have a high quality photographic lens for the objective and a screen which is both very fine in grain and high in dispersion.

In loading the machine with film, knob 12 is turned to the "open" position, as indicated by "O" on the drawings, which refers to the position of the film gate 7. Knob 12 through shaft 13 turns cam 14 which through bell crank lever 15 pivoted on the frame of head 2 on shaft 36 moves link 17 which is engaged with hinged frame 18 containing the glass gate 7a and by swinging frame 18 about axis 19 opens the film gate 7. When the pointer knob 12 is at the "closed" position, "C", film gate 7 is closed and the flat portion of cam 14 is brought flush with the extension on bell crank 35 upon which it acts, by means of spring 20 one end of which is attached by a pin to cam 14 with the other end secured to the head frame. With film gate 7 open, film spool 21 is placed upon one of the spindles 44 and the film is placed around guide roller 23 through film gate 7, around the other guide roller 23, and secured to an empty film spool or "take-up" spool 21 which may be identical with and interchangeable with the loaded film spool. Projection 24 on the cover of the internally reflecting prism 8 extends over the top edge of the stationary film gate compressor glass 7a' which prevents the film from slipping between the outside of this glass and the prism and yet leaves this space open sufficiently that the glass surfaces may be cleaned.

The film indexing mechanism consists of crank-handle 26 mounted on knurled hand wheel 27 secured on shaft 28 rotatably mounted in the side of head 2, said shaft having near its inner end a collar 29 secured thereto by a set screw 30. Said shaft has its innermost end beveled to an edge with included angle of approximately ninety degrees which engages with shouldered sliding plunger 31, the shaft engaging end of which is formed to an angular groove 32 cut across its end to match the beveled end of shaft 28. This mechanism is in duplicate, one on each side of the head 2. When the shaft 28 is rotated in either direction, plunger 31 is forced longitudinally away from shaft 28 until it is stopped by the bearing of its shoulder against the end of the bore in shell 33 and because of torsional resistance offered through pin 34 in said plunger, said plunger may not rotate until it has reached the limit of its longitudinal motion. This longitudinal thrust of plunger 31 through contact of said plunger with one arm of bell crank lever 35 rotates said bell crank lever 35 about its pivot 36 and in turn pulls link 17 causing the previously mentioned compressor glass frame 18 to swing about hinge axis 19 relieving the pressure between and separating the transparent compressor glasses 7a and 7a' of the film gate, the pressure having been produced by tension spring 37 secured at one end to the head frame 2 and at the other end to one of the bell crank levers to restore the plungers to their normal positions. During the above mentioned operations no tension has been placed upon the film, but at the time that plunger 31 has moved as far away from shaft 28 as possible, the shaft commences to transmit a torque to the groove in the end of plunger 31 so long as the crank handle 26 is turned, which torque is transmited through the pin 34 to the shell 33 which is secured to the grooved pulley wheel 38 which rides unsecured on shaft 28. Pulley wheel 38 is connected by endless belt 39 over the one-way clutch pulleys 43 to another identical pulley wheel 38. The clutch 42 is of a type which permits torque to be transmitted in one direction only, and with clutch bodies 43 designed to engage in such a manner and secured to film spindle shafts 44 that one or the other only of the shaft is turned for one direction cranking, the other shaft being idle, and the previously idle film reel spindle shaft 44 becoming the driving spindle when the direction of cranking is reversed.

The head 2 is rotatably and removably supported on the housing 1 as shown in detail in Fig. 4. The objective lens 9 is carried in a lens holder 45, which is threaded into a hollow boss 46 projecting upwardly from the top of the housing 1. This hollow boss 46 acts as a supporting spindle for the head 2, the head 2 being provided with a hollow shaft-way into which the spindle boss 46 projects, the axis of this shaft-way coinciding with the beam transmitted through the prism 8 to the mirror 10. A set screw 47 projecting through the end of the head 2 serves to hold the head fixed at any angle on the housing 1. It is thus possible to rotate the head about the housing so as to change the position of the image on the viewing screen 11 to make the same most convenient for observation by the operator.

It is also possible to remove the head 2 from the housing 1 and place it on another housing of a different size having a larger or smaller reflecting mirror and viewing screen.

The mirror 10 is provided with a three-point suspension means 48 so that the angle of the mirror may be adjusted when necessary to properly adjust the reflected image on to the screen 11.

Guide rollers 23 are so placed that when the film gate is open and the film is in motion, the film travels between the plates without touching either plate.

The invention described herein may be manufactured and used by or for the Government of the United States of America for governmental purposes without payment of any royalties thereon or therefor.

What I claim and desire to secure by Letters Patent is:

1. In a reading machine a film advancing means, a film gate, said film gate including a fixed film gate portion and a movable film gate portion operable transversely to the fixed film gate portion, a rotatable crank adapted to advance the film, a plunger operable by said crank, a bell crank, one arm of said bell crank operably connected with the movable film gate portion and the other arm of the bell crank adapted to be moved by said plunger when operated by said crank, and a cam contacting with said bell crank and adapted to operate the same independently of the rotatable crank.

2. In a reading machine a film advancing means, a film gate, said film gate including a fixed film gate portion and a movable film gate portion operable transversely to the fixed film gate portion, a crank adapted to advance the film, a plunger operable by said crank, a bell crank, one arm of said bell crank operably connected with the movable film gate portion and the other arm of the bell crank adapted to be moved by said plunger when operated by said crank, and a cam contacting with said bell crank and adapted to operate the same independently of the crank, and a spring adapted to return the cam into non-operative position.

3. In a reading machine a film advancing means including a shaft having a beveled end, a hand wheel fixedly mounted on said shaft, a pulley freely rotatable on said shaft, a shell rigidly connected with said pulley and provided with a slot in its free end, a plunger having a slot in one of its ends, the beveled end of the shaft being adapted to engage said slot, said plunger being arranged slidably in said shell, a pin extending through the plunger near the end away from the shaft and being located inside the slot of the shell, a film gate having a movable portion, a bell crank, a connecting link between said bell crank and the movable film gate portion, the free arm of the bell crank being located in the path of travel of the plunger when the same is forced into sliding motion by the rotating shaft before the pin engages the walls of the slot in the shell.

4. A film reading machine comprising a housing, a head rotatably mounted thereon, a film carrying means and a film illuminating means in said head, means for projecting an illuminated image of the film into said housing, a stationary mirror and a stationary viewing screen in said housing, said mirror being so positioned with respect to the illuminated image on the film as to direct it when the head is rotated to said screen irrespective of the angular position that said head may occupy on the housing, said head being rotatable about an axis substantially parallel to the axis of the projection beam, whereby the projected image may be oriented on said screen independently of the position of the film in said film-carrying means.

5. A film reading machine according to claim 4 and in which the means for projecting comprises a reflector in said head for directing the film illuminating beam from the head to said mirror in said housing in all angular positions of said head.

6. A film reading machine according to claim 4 and in which said head is mounted on a hollow bearing provided on said housing, the illuminated image being directed through the bearing into said housing.

7. In a film reading machine, a film gate having a movable portion and adapted to hold the film in a fixed plane while said film is at rest and to release said film from said plane while the film is in motion, a film advancing means, a film gate opening means comprising a bell crank connected to the movable film gate portion, a first means controlled by said film advancing means for actuating said bell crank, a manually controllable cam for operating said bell crank to move the movable film gate portion to open position independently of said first means, whereby said gate may be kept open for the insertion and removal of film without continuously manually holding it open.

8. In a film reading machine, a film gate adapted to hold the film in a fixed position while the film is at rest, said film gate including a fixed member and a second member movable transversely with respect to said fixed member for pressing the film against the fixed member, means for advancing the film through said gate, a plunger and a bell crank connecting said second member with said film advancing means, means controlled by said film advancing means and including said plunger and bell crank for transversely moving the movable member of the film gate away from the fixed member prior to the movement of the film therethrough, whereby said film gate is automatically opened in response to the motion of said film advancing means.

9. In a film reading machine according to claim 8 and in which a pivoted member is connected to the movable film gate member and is connected to said bell crank by said plunger.

10. In a film reading machine according to claim 8 and in which means normally urge said movable member to close, a rotatable crank adapted to operate the film advancing means and said plunger, a connecting rod secured to the movable film gate member and to one arm of said bell crank, said plunger being adapted to operate the other arm of said bell crank.

11. In a film reading machine, a housing, a stationary projection screen and a stationary reflecting means in said housing, a projection head, a source of light and a light projection system in said head, a mounting for said housing permitting its rotation about an axis substantially parallel to the optical axis of the projection system, a film supporting means mounted on said projection head, a second reflecting means mounted on said projection head and forming part of said projection system and rotatable with said head to reflect the illuminated film image to said stationary reflecting means regardless of the orientation of the film.

RUPERT H. DRAEGER.